(12) United States Patent
Drinkwater

(10) Patent No.: US 6,876,473 B2
(45) Date of Patent: Apr. 5, 2005

(54) DEVICE WITH ANTI-COUNTERFEITING DIFFRACTIVE STRUCTURE

(75) Inventor: John Drinkwater, Andover (GB)

(73) Assignee: Optaglio Limited, Swindon (GB)

( * ) Notice: Subject to any disclaimer, the term of this patent is extended or adjusted under 35 U.S.C. 154(b) by 189 days.

(21) Appl. No.: 10/312,136

(22) PCT Filed: Jul. 2, 2001

(86) PCT No.: PCT/GB01/02963
§ 371 (c)(1),
(2), (4) Date: Apr. 8, 2003

(87) PCT Pub. No.: WO02/03323
PCT Pub. Date: Jan. 10, 2002

(65) Prior Publication Data
US 2003/0155495 A1 Aug. 21, 2003

(51) Int. Cl.$^7$ ............................ G03H 1/00; B42D 15/10
(52) U.S. Cl. ............................. 359/2; 359/22; 359/24; 359/32; 359/33; 283/86
(58) Field of Search ............................. 283/86; 359/2, 359/22, 24, 25, 32, 33

(56) References Cited

U.S. PATENT DOCUMENTS

| | | |
|---|---|---|
| 4,206,965 A | 6/1980 | McGrew |
| 4,544,266 A | 10/1985 | Antes |
| 4,568,141 A | 2/1986 | Antes |
| 4,576,439 A | 3/1986 | Gale et al. |
| 4,629,282 A | 12/1986 | McGrew |
| 5,101,184 A | 3/1992 | Antes |
| 5,138,471 A | 8/1992 | McGrew |
| 5,331,443 A | 7/1994 | Stanisci |
| 5,461,239 A * | 10/1995 | Atherton ................ 250/566 |
| 5,483,363 A * | 1/1996 | Holmes et al. ............ 359/2 |
| 5,513,019 A | 4/1996 | Cueli |
| 5,582,434 A | 12/1996 | Skov et al. |
| 5,658,411 A | 8/1997 | Faykish |
| 5,659,408 A | 8/1997 | Wenyon |
| 5,694,229 A | 12/1997 | Drinkwater |
| 5,815,292 A | 9/1998 | Walters |
| 5,825,475 A | 10/1998 | Formosa |
| 5,856,070 A | 1/1999 | Korth |
| 5,971,277 A | 10/1999 | Cragun et al. |
| 6,036,807 A | 3/2000 | Brongers |
| 6,062,604 A | 5/2000 | Taylor et al. |
| 6,088,161 A | 7/2000 | Lee |
| 6,157,474 A | 12/2000 | Orr et al. |

FOREIGN PATENT DOCUMENTS

| | | | |
|---|---|---|---|
| DE | 3840037 A | * | 5/1990 |
| DE | 19612819 A | * | 10/1997 |

(Continued)

OTHER PUBLICATIONS

Burckhardt, C.B., "Display of Holograms in White Light", The Bell System Technical Journal, Dec. 1966, pp. 1841–1844.

(Continued)

Primary Examiner—John Juba, Jr.
(74) Attorney, Agent, or Firm—Townsend and Townsend and Crew LLP (57) ABSTRACT

An optical device for security and anti-counterfeit applications comprises a diffractive structure comprising a discrete region that in response to white light illumination generates an image by a process of diffraction in close angular proximity to the specular reflection and which is thus substantially non-visible to an observer, and which under coherent illumination generates a laser projection covert image which forms an image in an image plane located away from the physical plane of the device and which is angularly co-located in close proximity to the direction and position of the specular reflection.

27 Claims, 5 Drawing Sheets

FOREIGN PATENT DOCUMENTS

| | | |
|---|---|---|
| EP | 0 651 365 A1 | 5/1995 |
| EP | 0 919 961 A2 | 6/1999 |
| GB | 2 149 532 A | 6/1985 |
| GB | 2 243 139 A | 10/1991 |
| WO | WO 93 18419 A1 | 9/1993 |
| WO | WO 94 24615 A1 | 10/1994 |
| WO | WO 95 02200 A1 | 1/1995 |
| WO | WO 95 34008 A1 | 12/1995 |
| WO | WO 98 08691 A1 | 3/1998 |
| WO | WO 99 04364 A1 | 1/1999 |
| WO | WO 99 36271 A1 | 7/1999 |
| WO | WO 99 59036 A1 | 11/1999 |
| WO | WO 00 30043 A1 | 5/2000 |
| WO | WO 00/73991 A1 * | 12/2000 |

OTHER PUBLICATIONS

Hariharan, P., "Colour Holography", *E. Wolf, Progress in Optics vol. XX*, p. 265–324, North–Holland, 1983, Oxford, Amsterdam New York, US.

Tedesco, James M., "Holographic Diffusers for LCD Cockpit Displays", Proceedings of the SPIE, SPIE, 1994, vol. 2219, pp. 327–337, Bellingham, VA, US.

* cited by examiner

DEVICE WITH ANTI-COUNTERFEITING DIFFRACTIVE STRUCTURE

This invention is in the field particularly of security anti-counterfeit devices operating on the principle of optical diffraction and relates to an improved form of optical security device for use in the protection of documents and articles of value from counterfeit to verify authenticity.

Several types of optically variable diffractive devices are now used to prove the authenticity of items of value and to prevent their fraudulent duplication for example for banknotes, plastic cards, value documents such as fiscal stamps, travel documents such as passports and for the authentication of valuable goods.

Devices based on the principle of optical diffraction are often used for these purposes because they can produce, by the process of optical diffraction, an optically variable image with characteristic features such as depth and parallax (holograms) and movement features and image switches (purely diffraction grating devices and some holographic devices). Such diffractive, optically variable image forming devices are used as anti-counterfeit devices both because their effects are highly recognisable and cannot be duplicated by print technologies, and because specific and difficult to replicate optical and engineering techniques are required for their production.

These diffractive optically variable image forming devices are generally manufactured and form their effects base on holographic or pure diffraction grating techniques and are often manufactured as embossed surface relief structures as known in the art (e.g. Graham Saxby "Practical Holography" Prentice Hall 1988). They are typically applied to documents of value, plastic cards and articles of value to be protected in the form of holographic or diffractive hot stamping foil or holographic or diffractive labelling, often tamper evident.

These are various forms of pure diffraction grating devices already revealed and in use as such security devices. One example would be U.S. Pat. No. 4,568,141, which reveals a diffraction optical authenticating element that provides a colour pattern moving at a predetermined velocity along a predetermined track when the document is illuminated from a first direction and viewed from a second direction. This device consists of a plane diffraction grating structure which defines a predetermined track where at least one of whose spatial frequency or angular orientation varies along said track such that when the device is illuminated and rotated in a plane adjacent region of diffraction grating structure successively diffract light to cause a viewer to see a colour pattern which appears to move along said movement track. Each element of this device is a pure plane diffraction grating replaying a visually observable image in white light which will not form an out of plane coherently viewable image. A manufacturing method for such a security diffraction grating master is revealed in U.S. Pat. No. 4,761,252 the technique using a punch to impress successive small areas of a flexible embossing die into a sheet of thermoplastic material. U.S. Pat. No. 5,034,003 reveals another form of optical security device using diffraction gratings to produce a switching image by recording the device as sets of pixels with each pixel consisting of small areas of different grating spatial frequencies and orientations to form a diffracted image visible from different directions. This device forms visually observable images located on the image plane of the device but there is no provision for additional covert images formed under coherent light. Another form of pure diffraction grating security device and another method for producing the same is the technique of electron beam lithography to directly write the detailed diffractive structures on a microscopic level by use of electron beam. Some examples of such teachings are WO9318419, WO9504948 and WO9502200, describing electron beam generated diffractive optical security devices. None of these descriptions anticipate devices that create an additional out of plane image, viewable under coherent illumination.

Diffractive optical variable image forming devices are also known and have been produced by holographic methods, such devices are known for their use in security applications for example on credit cards and banknotes. Examples of teachings on such holographically manufactured security structures include U.S. Pat. Nos. 5,694,229, 5,483,363 and WO9959036. The optical recording and manufacturing methods and other teachings of these patents are incorporated by reference. Again these teachings do not anticipate additional covert features particularly an additional entirely covert 'in-line' holographic image to be visualised under specialised coherent illumination.

Earlier teachings on machine readable or coherently viewable holographic or diffractive structures as used for security include, for example, U.S. Pat. No. 4,544,266 reveals the authentication of a document by the use of a machine readable diffraction based encoded mark, and U.S. Pat. No. 5,101,184 describes another way of machine reading a diffractive security device by detecting the different intensities of diffracted light produced in different directions by asymmetric relief structures. However, neither of these teaching reveals the formation of a coherently viewable image.

A security device consisting of a volume hologram contains a visually viewable hologram combined with a superimposed laser transmission hologram is revealed in DE-A-3840037, where the laser transmission hologram image is designed to be non-discernable under white light but designed to be read under coherent laser light using a visualiser or machine reader device but in this case the element is superposed over the whole device, rather than being localised, and is not a covert in-line hologram.

U.S. Pat. No. 5,483,363 describes how an embossed surface relief hologram can contain a superimposed second diffractive structure designed to be machine readable by creating an out of plane image. However, in this teaching the second structure is superimposed over the whole area of the first and is designed to be completely non-visible to an observer by the use of superimposed very weak diffraction gratings which do not form an out of plane image but where the visual diffraction image is suppressed upon illumination to allow detection of the out of plane machine readable image. This device again does not anticipate using an in-line hologram as a means of completely concealing and then revealing a covert projected image.

The problems with the two above devices is that the hidden images were distributed over the whole area of the device including over the visual image generating diffractive structure, and therefore tend to interfere with and degrade the visual image from the device so requiring the diffractive structures corresponding to the hidden images to be low in efficiency compared to the main visual image to avoid resulting in competition and degradation.

Another holographic system and method for determining which of a plurality of visually indistinguishable objects which produces a visually observable diffractive image have been marked with a covert indicator is explained in U.S. Pat. No. 5,825,475 which reveals a number of usually indistinguishable objects some of which have been marked with a covert holographic indicator which is exposed to be viewed but which is detectable only when illuminated with a coherent reference light of predetermined wavelength designed to be evaluated by a specific form of scanner evaluation unit.

A known holographic system for forming a covert coherently viewable image uses a hologram containing a diffractive matt area, which upon laser illumination generates an out of plane image consisting of text. Another known system that forms a coherently viewable image is a hologram that contains an area of discrete small dots, spaced apart over a distance of several millimeters which generates under laser illumination two covert out of plane images each mapping to a pair of dots. These techniques have the disadvantage that the covert areas replay a visually observable diffractive image and are awkward to re-illuminate and align to view for inspection.

The object of this invention is to provide an improvement upon the above devices in particular to record a completely non-visible covert coherently viewable out of plane image within a security holographic or other form of diffractive structure, without degrading the visual security diffractive image but with re-illumination and inspection of the device straightforward.

According to one aspect of the current invention there is an optical device comprising at least one discrete region comprising diffractive structure wherein the diffractive structure is arranged to replay in response to white light illumination exhibiting specular reflection a first image in close angular proximity to the specular reflection of the white light such that the said first image is non-visible to an observer, and wherein the diffractive structure is arranged to replay in response to coherent light illumination exhibiting specular reflection a second covert image visible to an observer when imaged on a separate image plane located away from the physical plane of the optical device and replaying in close angular proximity to the specular reflection of the said coherent light.

In this invention an improved form of diffractive security anti-counterfeit device is taught where a conventional diffractive optically variable image device, such as a security hologram or kinegram or the like, has combined with it a discrete area containing an in-line holographic component containing a coherently viewable covert image which under normal white light illumination conditions displays no diffractive image whatsoever and is essentially an entirely featureless area save for perhaps a slight matt effect, but which under coherent laser illumination generates an in-line holographic image located around the directly specular reflection from the surface as an in-line projection holographic element.

The advantage of this device over previous devices is that the device produces substantially no diffractive replay that can be seen by an observer under normal white light viewing conditions but produces when coherently illuminated by a laser pointer or similar an out of plane holographic image located about the direct specular reflected beam and therefore very easy to find and authenticate.

In this invention a device is revealed where a completely non-visible covert coherently viewable out of plane image is recorded within a security holographic or other form of diffractive structure, without degrading the visual security diffractive image but with re-illumination and inspection of the device straightforward. In this new device a conventional diffractive optically variable image device, such as a security hologram or kinegram or the like, has combined with it a discrete area containing an 'in-line' holographic component which under normal white light illumination conditions displays no diffractive image whatsoever and is essentially an entirely featureless area save for perhaps a slight matt effect but which under coherent laser illumination generates an in-line holographic image located around the directly specular reflection from the surface as an in-line holographic projection element. The advantage of this device over previous devices is that the device produces substantially no diffractive replay that can be seen by an observer under normal white light viewing conditions but produces when coherently illuminated by a laser pointer or similar an out of plane holographic image located about the direct specularly reflected beam and therefore very easy to find and authenticate. The advantage of this improved structure is that there is no diffractive replay visible at all and so the structure does not reveal itself as a diffractive area and so is totally concealed and covert yet is localised in a discrete area of the design. Thus this feature can be made optically efficient without degrading the main optically variable image and can be small in area to reduce degradation due to surface roughness. Another advantage is that visualisation under coherent illumination should be relatively straightforward as the out of plane image is located around the specularly reflected beam. An advantage of having an image located around the specularly reflected beam is that under white light illumination the diffracted light will be virtually completely non-visible to an observer and depending on the depth of patterning that area will look either featureless or slightly matt. Normally the area of this new device will be localised and discrete form other diffractive areas of the device, rather than superposed, in order to avoid degradation of the visual image.

Another advantage of this new feature is that it requires very special and unusual holographic recording arrangements or direct calculation and direct write processes to record the device and in particular to record the device contiguous with a security hologram or diffractive element which makes reverse engineering or reproduction of the device even for those skilled in the art prohibitively difficult. Direct calculation of the diffractive structure and direct writing can add additionally to the security of the device by creating a diffractive image that has a non-symmetric replay that can only be created by non-classical, direct write techniques.

This is therefore a new type of extremely secure covert holographic diffractive structure replaying a coherently viewable image in a way close in form to an in-line hologram where the reconstruction direction is closely located around the specularly reflected beam used for reconstruction. This new device thus improves over the previous teachings. In some of the previous teachings the interrogatable coherently viewable structure was spread over the entire area of the device thus resulting in either a degraded visual authentication device due to fringe competition or a weak coherently detectable structure. In other previous work the coherent structure was also localised into small areas and replayed a visual diffracted image whilst here the coherent structure is also localised so that high diffractive efficiency for easy visualisation under coherent light can be achieved whilst the new structure has additionally been designed with characteristics that enable it to produce no discernable visual diffracted image to ensure its presence and function remains completely covert. It is also an object of this invention to provide a visually completely covert system that does not reveal its presence by an observable diffracted image, where the first (and the first few of the much weaker higher orders) diffracted orders are very near the specular reflection from the surface. This system is significantly more secure and difficult to counterfeit or remanufacture than the previous systems whilst being typically an integrated part of the security image. The new device is also significantly more complex to produce than previous devices and requires much more sophisticated techniques for manufacture.

In this invention, an optical security device consists of a reflective surface relief structure consisting of a diffractive structure comprising a discrete region which generates in response to white light an image by the process of diffraction of light, the diffractive structure being responsive to white light illumination to generate a diffractive image in a direction in close angular proximity and angularly co-located with the specular reflection from the surface so that the diffracted image generated under white light illumination is non-visible to an observer, and the device being responsive to illumination with coherent light to generate a covert image, the covert image forming a focussed image on a separate image plane a distance away from the physical plane of the device, the covert image located in a direction in close angular proximity and angularly co-located with the position and direction of the specular reflection and the covert image consisting of alphanumeric characters or other graphic indicia or a continuous tone image.

The above holographic surface relief structure in a preferred embodiment is co-located within and part of a main holographic or diffractive structure designed to produce a visually discernable diffractive or holographic security image as known in the art, be this a security hologram, diffractive grating based structure such as a kinegram or the like.

By the term reflective surface relief structure we mean an embossed holographic or diffractive structure as known in the art where the surface relief pattern is embossed into a substrate or embossing lacquer typically to form a label, hot foil or other form of diffractive device embodiment as known in the art. Usually such surface relief structures are vacuum coated with a metal such as aluminium to provide an efficient reflector and to enhance the effect, but within the scope of this invention we also allow for the use of different metals of different reflectivities, partially transmitting and partially reflecting devices, and devices substantially transparent coated with, for example, inorganic layer such as zinc sulphide or similar for use as data protection overlays typically.

By the term 'diffractive structure' as used above we refer to the surface relief structure of this new device which generates its diffracted image by a process of diffraction of light and is typically manufactured by a holographic process as known in the art adapted to record this new device. Typically in the holographic field a master image could be created using a holographic H1-H2 process using laser light. An alternative and advantageous technique would be the direct writing of such a structure using, for example, electron beam lithography. The characteristics of this new structure is that the structure would produce, under coherent illumination, a real image located at a distance from the real plane of the device replaying at an extremely small diffraction angle of light to generate an image closely angularly co-located with and around the direct specular reflection from the surface. A typical, though non-restrictive, imaging forming distance being in the range 150 mm to 300 mm to make usage convenient.

Such a device could also be generated by the direct calculation of the appropriate optical microstructure pattern and its direct writing but using a process of electron beam lithography or similar to directly write the microstructure. In one method one could direct write the diffractive focussing structure. In another method the area of the structure could be divided into pixels or discrete subdivisions of any shape, these further sub-divided into sub-pixels, each consisting of a diffraction grating of slightly different characteristics, with each pixel containing several such grating areas each with slightly different replay angles and orientations designed to produce under coherent illumination the appropriate far field image with, for example, grey scale effects being determined by the relative balance of sub-pixel areas. A fractal pattern would be a useful way to assemble such a sub-pixel and pixel pattern to provide a structure difficult to back engineer. A particular advantage of electron beam lithography direct write techniques is the ability to produce asymmetric structures to allow the reproduction of asymmetric diffractive images, where for example the device replays only a +1 diffractive order as known in the art, with the −1 diffractive structure being suppressed, as opposed to a conventional holographic structure which would have a symmetric profile and would usually replay both +1 and −1 diffracted orders with approximately equal intensity. This allows the realisation of a particularly advantageous form of the device where the diffractive image has an asymmetric replay and thus the far field image is not rotationally mirror symmetric around the specularly reflected beam so allowing novel and secure forms of projected image that definitely could not be reproduced by conventional holographic techniques.

It should be appreciated that the scope of this invention is not just limited to surface relief embossed diffractive structures, but that the concept of additional discrete regions in a security device forming an additional covert image coherently viewable image concealed near the specular reflection from the device is equally applicable to other forms of holographic production techniques such as reflection holography, based on interference layers, manufactured in such materials as photopolymers, silver halide, dichromated gelatin, etc. these applications and methodologies are included within the scope of this invention.

In one preferred embodiment of this invention these special diffractive structures would be combined as one component of a main holographic or diffractive security image containing a mixture of rainbow holographic and purely diffractive elements. These special diffractive structures could also be combined (for example using a mechanical recombination process) with pure diffraction grating based devices as known in the field such as, for example, a "kinegram" or a computer calculated and direct written diffractive structure recorded by for example an electron beam lithography system such as the device known as an "Exelgram". In one embodiment the form of diffractive structure revealed here could be integrated as part of the design where its matt appearance is additionally used as a visual design element or, for example, as one component of the visual image design.

In one useful form of this invention different discrete regions of the diffractive structure whilst being visually identical in matt appearance generate different coherently viewable images. This would allow different areas of a device or design to produce different coherently viewable images for both additional security and allowing additional information to be carried.

By the terms 'close angular proximity and angularly co-located with the specular reflection from the surface' we mean that the diffracted light from the new holographic diffractive structure is reconstructed by the structure around and in the same direction as the usual specular reflection of light incident on a substantially planar reflective surface and extends around this direction of specular reflection by less than 7 degrees and typically around 5 degrees. This means that the covert image formed by this structure when illuminated by a suitable coherent laser light source will be focusable on a viewing screen and located along the direction of and extending around the specular reflection. This image will typically be formed at a distance of 150 mm to 300 mm from the device, although in some instances the working distance could be larger. An advantageous form of this device is where this image is non-symmetric around the reflected beam to provide a particularly secure form of device impossible to reproduce with holographic techniques and only accessible by a direct write, typically electron beam lithographic, approach to generation of the diffractive structure.

Another suitable form of diffractive surface relief structure usable for generating this type of effect is one manufactured by a holographic recording process using an H1-H2 process as known in the art and as referenced, by recording a surface relief image typically into photoresist. To produce this device this process would be adapted to use a process where the rainbow slit is replaced by a mask over the H1 in the form of the covert image to be recorded and where a reference beam impinges on the recording medium from precisely or very closely the same direction as the object beam from the covert image to form an 'in-line' holographic image in this are with a very low spatial frequency of carrier diffraction grating compared to the areas of the device designed to replay a visual diffracted image.

It can be envisaged that the organisation of regions of these new covert holographic diffractive devices could take several forms. For example one form of device could be this structure alone and then would be entirely covert such that no visual image is replayed at all but that on re-illumination with coherent light a covert image is revealed. One could also envisage devices where different areas of the device contained structures of this new form but which reconstructed different covert images upon coherent illumination depending on which message had been recorded into a particular area.

In another form of the device, the new device could be combined with a visual diffractive security device such as a security hologram or kinegram. In this combined device the covert coherently readable structure could occupy discrete areas which could be a single area or distributed small areas. Each element could be of flexible size and shape—typically an approximate minimum single element size of 0.2 mm would be the smallest usable to provide a usable signal viewable against the reflected light from a laser pointer. A more useful dimension would be approximately in the range 0.5 to 2.0 mm diameter or dimension of graphic matched to a laser pointer of beam diameter approximately 1.5 mm to generate a bright and easily viewable coherently replayed image by fully and evenly illuminating most of the readable region, although the size is entirely flexible and could be much larger. These areas could be shaped into any suitable graphic or alphanumeric shape or line art on the image plane to provide matt areas integrated into the main design of the visual diffractive element. The covert laser projection feature could also be distributed into smaller controlled areas around the design (the distinct areas could potentially reconstruct different projected graphic images for additional information storage or security) and also for duplication to provide more durability against mechanical damage and abrasion. Controlled imaging of the shape of the laser projection feature on the image plane of the device can be achieved by the use of an image projected in an H1 to H2 arrangement as known in the art or by pre-calculation and direct writing of the structure.

It should be appreciated that in a preferred embodiment the diffractive surface relief structure revealed here would be integrated as part of a main visual holographic or diffractive security image both to increase the complexity of the overall structure to increase its anti-counterfeit properties and also to conceal the presence of this new structure. Thus, under typical conditions one would anticipate interrogation and authentication by an inspector verifying the structure by illuminating it with for example a laser pointer pen and reconstructing the image on, for example, a simple hand held viewing screen held in the directly reflected beam. It is an object of this invention over prior systems to make this device totally covert by ensuring it has no visible diffracted replay and also easier to authenticate than previous devices.

A useful and preferred embodiment of this invention is where the device consists of several regions potentially each providing different projected images and preferably several or many more such regions. In these devices the coherent projected image could be of the form of a continuous tonal image, or an alphanumeric or some other graphic design and in one preferred embodiment the projected image straddles the specular reflection and has some components very near, or coincident with, the specular reflection. In a embodiment the projected image would be symmetric about the specular reflection. This type of projected image would be most suitable for holographic production. In another preferred and more secure form of the device the projected image could be non-symmetric by the use of pre-calculated computer generated techniques and direct writing of the structures by, for example electron beam techniques, to generate asymmetric structures, where the covert coherently viewable image was not symmetric about the specular reflection and thus of an increased security value against holographic counterfeit by re-origination of the structure.

A useful addition to the main invention of a coherently viewable security image revealed here would be the combination with it of a second very small grating pitch diffraction grating structure also designed to replay an additional more specialised covert out of plane coherently visualised image. We would anticipate such a feature used in addition to the coherently viewable covert feature in this invention as a hidden highly secure forensic feature, designed for more sophisticated authentication using a customised laser based viewer. The principle of operation would be that if this additional covert feature is recorded with a security diffractive or holographic image of a carrier grating spatial frequency considerably higher (i.e. smaller grating pitch) than the spatial frequency of the any main holographic image in the visual part of the device, then as the pitch of the superimposed grating becomes smaller the first order angle of diffraction increases beyond the point that any replay can be seen from this element when the device is viewed along or near the normal even with a very steep reference beam angle for reconstruction. In fact what happens is that the first order diffracted angle becomes very large and the first order diffracted beam is actually directed back towards the illuminating source in a reconstruction geometry that when used in spectroscopic applications of diffraction gratings is known as the 'Littrow' geometry. In this geometry no evidence of this addition diffractive structure can be seen on the replay, when viewed in a normal configuration for visual viewing and the structure can only be detected in a 'Littrow' configuration. A very useful additional security feature is therefore to record an additional covert out of plane covert image recorded as a high spatial frequency carrier grating (smaller diffraction grating pitch c. 0.6 micron or less), and suitably this can be recorded as an all over superposition over the whole area of the device typically weaker than any main visual security image so that very little visual evidence appears of this additional image. Alternatively this higher frequency grating could be introduced as small discrete areas, possibly interposed between other areas dispersed across the device or in a localised region as best fits the design and application. This additional forensic coherently viewable image can be revealed by the use of specialised and difficult to reproduce geometric viewing conditions under coherent illumination in a suitable 'Littrow' geometry (very steep illumination angle and image focussed in a near retro-reflection geometry) to provide an additional a highly secure covert out of plane image which can be recorded and detected to provide an additional extremely covert coherently viewable image.

This additional technique thus provides an additional novel security device replaying a first coherently viewable laser projection image plus a second different covert and more hidden forensic type of covert coherently viewable image, hidden form normal observation and viewable only in a very particular high angle geometry by virtue of its high spatial frequency. In an alternative embodiment these very fine grating features (typically around or less than 0.5 micron in pitch) could be localised into discrete graphical elements visible on the image plane of the device, each replaying a separate covert image under suitable geometry 'Littrow' illumination in an analogous technique to the main invention here. Another advantage of using-very fine grating structures is that they require particularly unusual and stable optical interference geometries to record or direct write processes such as electron beam lithography and are technically not accessible to lower grade less well equipped holographic and diffractive manufacturers and so called "dot matrix" systems. This makes these types of very fine grating structures extremely useful as additional forensic security feature.

It should be noted that the combination of a relatively coarse pitch diffractive feature (very low spatial frequency) coherently viewable covert image and a high spatial (fine pitch diffractive feature) provides a very high security feature that would be extremely difficult to reproduce. The further combination of these structure with a visual diffractive device whose spatial frequency would normally be midway between these two extremes to provide a device convenient to view would provide an extremely high security and difficult to reverse engineer diffractive security device This invention will now be illustrated with the help of schematic drawings to explain preferred embodiments and potential manufacturing methods.

FIGS. 5 and 6 show one potential manufacturing process illustrating the H1 to H2 recording process for manufacturing a 'Benton' or rainbow hologram as known in the art.

FIG. 7 illustrates how the intermediate hologram of FIG. 5 is used in an optical transfer arrangement as known in the art to form an image plane transfer hologram or H2 suitable for white light viewing. This figure further illustrates how the laser projection diffractive device is recorded by replacing the conventional off axis H2 reference beam with an 'on-axis' reference beam virtually co-linear (or angularly very close to, typically around 5 degrees) of the impinging object beam direction. In this example the small angle between reference an object beams is obtained by reflecting the reference beam off a beam-splitter interposed between H1 and H2 planes.

The illustrations will now be explained in detail.

Figure 1:
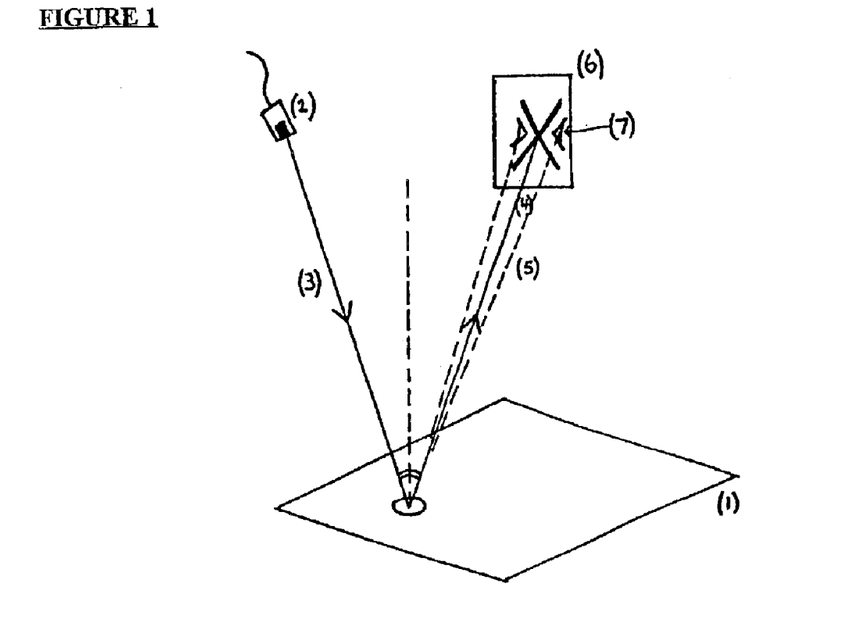
FIG. 1 illustrates the device, potentially as integrated as part of another diffractive security device such as a hologram and illustrates its behaviour under coherent illumination to form an out of plane laser projection image located close to the specular reflection.

FIG. 1 illustrates the device, potentially as integrated as part of another diffractive security device (1) such as a hologram and illustrates its behaviour under coherent illumination (3) from a laser pointer or similar source (2) to form an out of plane laser projection image (7) located (5) and focusable (7) very close to the specular reflection (4). The figure illustrates the behaviour of the device under coherent laser illumination (3) from a laser source such as a laser pen pointer (2) showing how the coherently viewable laser projection image is reconstructed by the device far from its physical image plane, reconstruction (5) focussing at image (7), and co-located with the specular direct reflection of the beam (4) and imaged onto, for example, a simple viewing screen (6).

Figure 2:
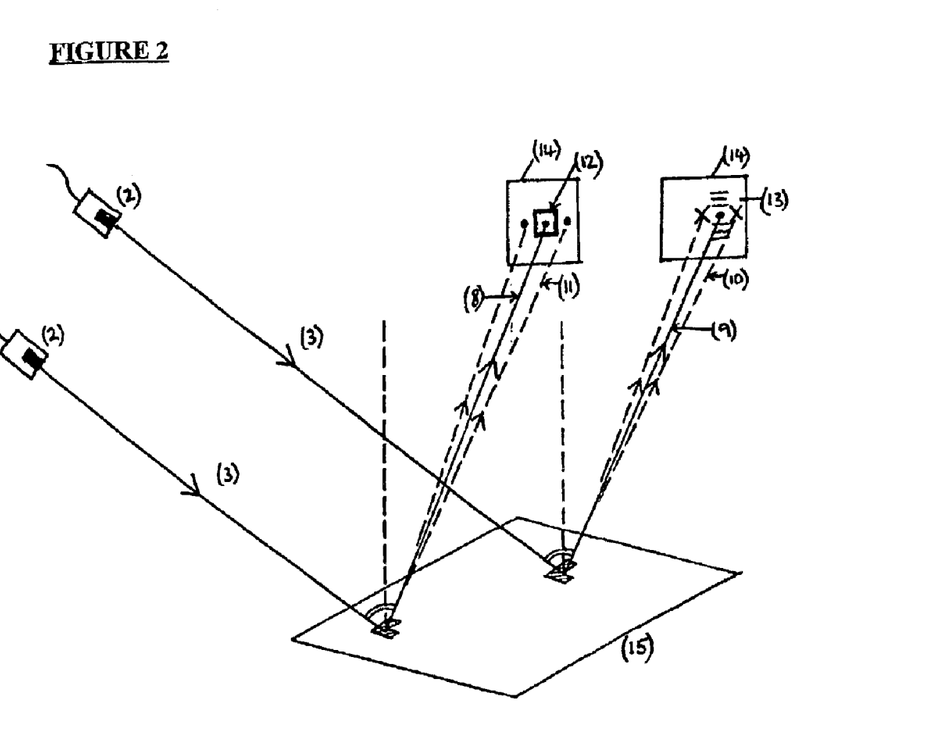
FIG. 2 illustrates a second form of the device again under coherent illumination, in this case showing two areas of the main image displaying different projected images and also showing the type of coherent reconstruction that would be obtained from a typical rainbow display hologram.

FIG. 2 illustrates a second form of the device again under coherent illumination, in this case showing two areas of the main image displaying different projected images (12) and (13). This shows how regions of the device (15) reconstruct under coherent illumination (3) different laser projection graphical covert images (12) and (13), and also shows how the alignment of the viewing screen (14) is not critical due to the location of the covert image near the specular reflection (8) and (9) making alignment and read-out considerably easier than in previous systems.

Figures 3, 4:
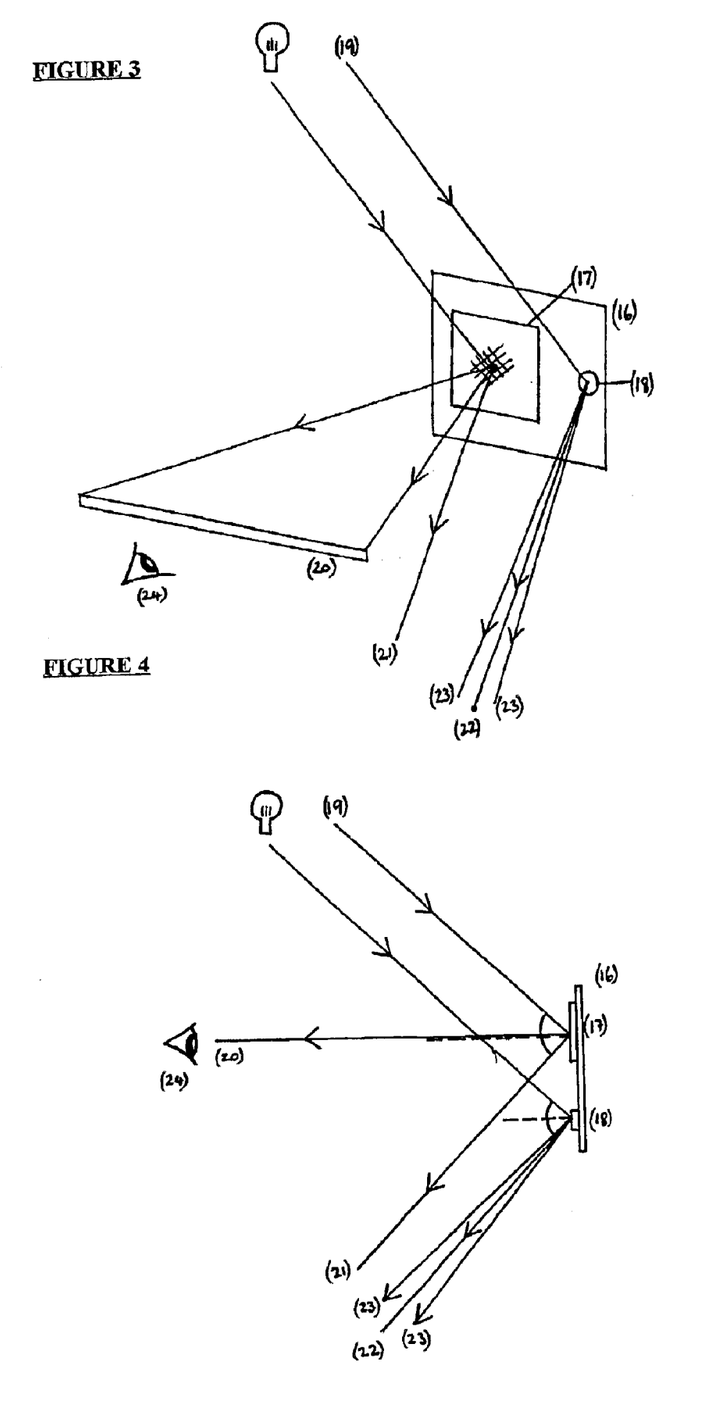
FIG. 3 illustrates the behaviour of the device combined with a visual diffractive or holographic image under white light illumination showing how the visual image reconstructs light into an observers eye, whilst the laser projection image diffracts white light in a non-visible direction around the specular reflection.
FIG. 4 again illustrates the device of FIG. 3 showing the different angular reconstructions in white light between the visual replay of a visual holographic or diffractive image and the narrow diffraction angle replay of the laser projection device. This shows how the diffracted light from the laser projection area would remain localised around the specular reflection and hence very difficult to view.

FIG. 3 illustrates the behaviour of the device (18) combined with a visual diffractive or holographic image (17) under white light illumination (19) showing how the visual image reconstructs light (20) into an observer's eye (24), whilst the laser projection image diffracts white light in a non-visible direction (23) around the specular reflection (22). This figure illustrates schematically the device (18), potentially as integrated as part of another diffractive security device such as a security hologram (16) and illustrates its behaviour under white light illumination from a spot light or other similar source (19) where the visual holographic device replays an image (20) for observation by an observer (24).

FIG. 4 again illustrates the device of FIG. 3 showing the different angular reconstructions in white light between the visual replay (20) of a visual holographic or diffractive image (17) and the narrow diffraction angle replay of the laser projection device (23) located around the specular reflection (22). This shows how the diffracted light from the laser projection area would remain localised around the specular reflection (22) with a very small diffraction angle compared to a visual hologram and hence very difficult to view.

Figure 5:
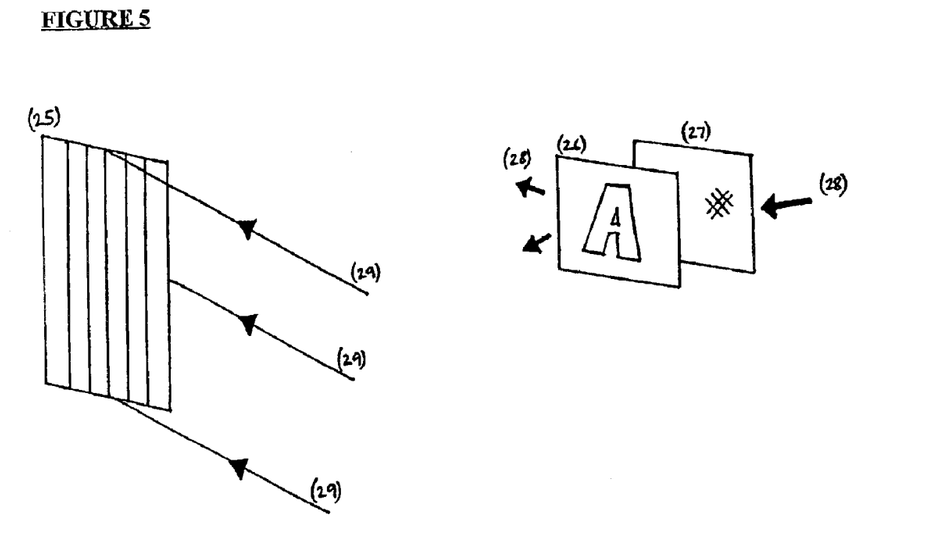
FIG. 5 illustrates schematically the recording of an H1 hologram of an object as known in the art and FIG. 6 illustrates the H2 transfer process.
Figure 6:
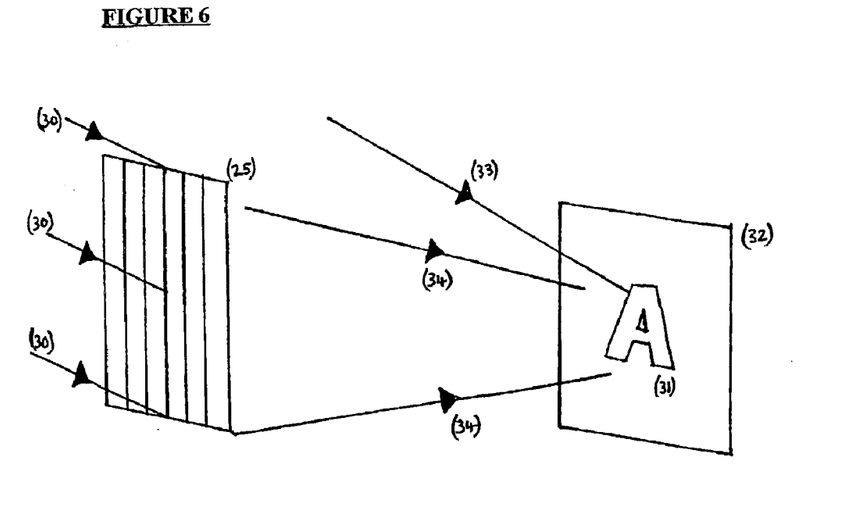

FIGS. 5 and 6 show one potential manufacturing process illustrating the H1 to H2 recording process for manufacturing a 'Benton' or rainbow hologram as known in the art. FIG. 5 illustrates schematically the recording of an H1 hologram (25) of an object as known in the art (26, 27) and FIG. 6 illustrates the H2 transfer process. FIG. 5 illustrates schematically the recording process for recording an intermediate hologram or H1 as known in the art by exposing (and subsequently developing) a photosensitive recording medium (25) typically silver halide or photopolymer to a reference beam (29) and an object beam (28) which in the case of a 2D-3D hologram as known in the art would consist of a back-lit diffusing element (27, 28) and a aperture mask defining the artwork element (26). FIG. 6 illustrates the transfer process as known in the art to take the H1 (25) as recorded in FIG. 5, re-illuminate it with a reference beam (30) conjugate to the original reference beam to thus reconstruct a real projected image (34) of the original object (31). The projected image (31) is focussed at or near the plane of a second recording medium (32) according to the type of image plane and movement and depth features required, the second recording medium (32) being typically for an embossed hologram or diffractive element a material capable of recording a diffractive image as a surface relief structure and would typically be a photoresist material. A second reference beam is then introduced (33) to record a second or H2 hologram. It can be appreciated that several such devices can be superimposed or recorded adjacent to each other and that one H1 containing several such recordings or several H1's or a mixture of projection and other masking techniques as known in the art (e.g. U.S. Pat. No. 4,918,469, U.S. Pat. No. 4,717,221, U.S. Pat. No. 4,629, 282). To form an embossed hologram the H2 hologram formed in photoresist would be silvered to deposit a conductive layer, copied probably several times in a plating process as known in the field to form metal copies of the structure and then roll embossed into a plastic material or embossing lacquer or hot foil material or similar and then metallised to form an embossed hologram as known in the art.

Figure 7:
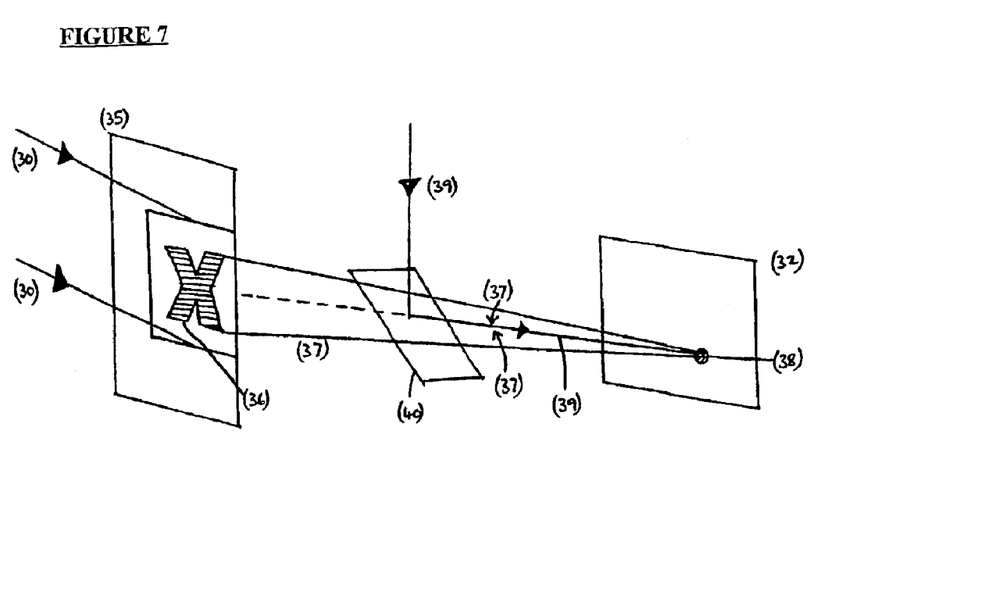

FIG. 7 illustrates how the intermediate H1 hologram of FIG. 5 is used in an optical transfer arrangement as known in the art to form an image plane transfer hologram or H2 suitable for white light viewing. This figure illustrates how the process illustrated in FIGS. 5 and 6 may be adapted for recording the device taught in this invention. In this illustration a standard H1 would be recorded as in FIG. 5. However, on transfer at the H2 stage on reconstruction with the reference beam (30) instead of masking the H1 (33) to form a rainbow or 'Benton' slit a mask (36) would be used at or near the plane of the H1 to define the form of the covert image (38) corresponding to the visual image being projected from that area of the H1 (37) onto the H2 recording plane (32). So for FIG. 7 the mask 'X' (36) corresponds to the area of the H1 into which the visual image plane artwork of one covert structure has been recorded (38). This figure further illustrates how the laser projection diffractive device is recorded by replacing the conventional off axis H2 reference beam with an 'on-axis' reference beam (39) virtually co-linear (or angularly very close to, typically around 5 degrees) of the impinging object beam (37) direction. In this example the small angle between reference an object beams is obtained by reflecting the reference beam off a beamsplitter (40) interposed between H1 and H2 planes. After set up the H2 exposures and development would be substantially as for FIGS. 5 and 6. It can be appreciated that several such structures can be combined together and that the steps of FIGS. 7, and 8 can be combined together into a single step or sequentially to form complex composite structures containing this invention and all forms of security holograms and other diffractive structures. It can also be appreciated that these structures can be combined together into more complex structures by other means such as mechanical recombining. It can also be appreciated that the recording method of FIG. 7 is not exhaustive and an alternative technique as known in the art would be to use an image plane mask over the photo-resist H2 plane to define the area of artwork to be exposed and to replace the masked H1 of FIG. 7 with a masked diffuser using a similar process to U.S. Pat. No. 4,918,469, U.S. Pat. No. 4,717,221, U.S. Pat. No. 4,629,282 for example.

Figure 8:
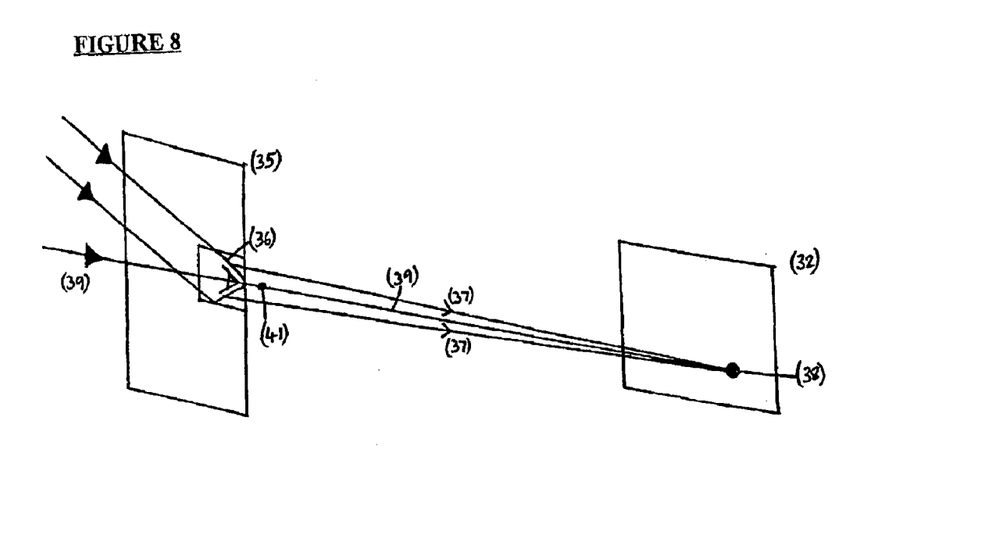
FIG. 8 is another very similar illustration to FIG. 6 of a recording geometry for this device, differing from FIG. 6 in that the closely co-linear reference beam is introduced from directly behind or very close to the H1.

FIG. 8 is another very similar illustration to FIG. 7 of a recording geometry for this device, differing from FIG. 7 in that the closely co-linear reference beam (39) is introduced from directly behind or very close to the H1 (35).

Figure 9:
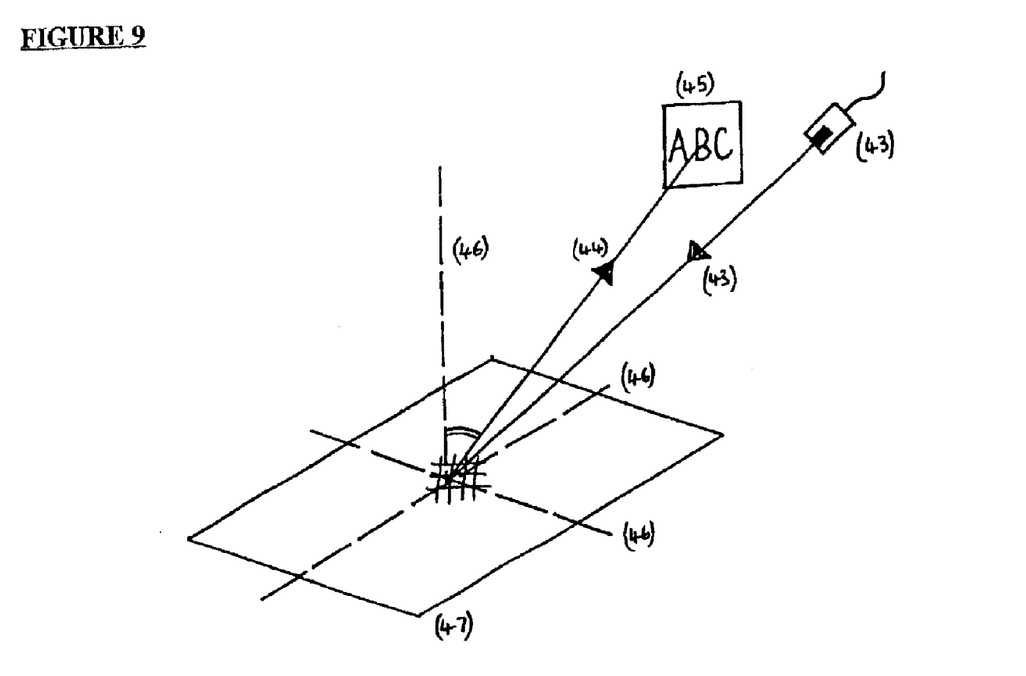
FIG. 9 illustrates the 'Littrow' coherent read-out and reconstruction geometry for the additional forensic covert out of plane feature.

FIG. 9 illustrates the 'Littrow' coherent read-out and reconstruction geometry for the additional forensic covert out of plane feature. The feature area (47) is illuminated with a coherent beam from a laser source (43) at a very steep angle to a normal contained in a reference frame (46) defining the plane of the device and a normal to this surface. The coherently viewable image (45) from this additional fine diffractive forensic feature is reconstructed also at a very steep angle (44) to the normal to form a reconstructed out of plane image very close to the laser illumination direction (43) making this device non-visible in terms of visual image replay under white light under virtually all conditions of normal observation.

What is claimed is:

1. An optical device comprising at least one discrete region comprising a diffractive structure wherein the diffractive structure is arranged to replay in response to white light illumination exhibiting specular reflection a first image in close angular proximity to the specular reflection of the white light such that the first image is non-visible to an observer, and wherein the diffractive structure is arranged to replay in response to coherent light illumination exhibiting specular reflection a second covert image visible to an observer when imaged on a separate image plane located away from the physical plane of the optical device and replaying in close angular proximity to the specular reflection of the coherent light.

2. An optical device as claimed in claim 1, wherein the first image is angularly co-located with the specular reflection of the white light from the surface of the optical device.

3. An optical device as claimed in claim 1, wherein the second covert image is angularly co-located with the specular reflection of the coherent light from the surface of the optical device.

4. An optical device as claimed in claim 1, wherein the second covert image comprises any one of, or any combination of, alphanumeric characters, graphical indica or continuous tone images.

5. An optical device as claimed in claim 1, comprising a plurality of discrete regions of diffractive structure.

6. An optical device as claimed in claim 5, wherein the plurality of discrete regions of diffractive structure serve to replay at least two different covert images when illuminated with coherent light.

7. An optical device as claimed in claim 1, wherein the diffractive structure is in the form of a reflective surface relief structure.

8. An optical device as claimed in claim 7, wherein the reflective surface is a metal surface.

9. An optical device as claimed in claim 8, wherein the metal surface is discontinuous.

10. An optical device as claimed in claim 7, wherein the reflective surface is a dielectric material and the device is semitransparent.

11. An optical device as claimed in claim 1, wherein the diffracted light forming the second image subtends an angle of 7 degrees or less from the discrete specular reflection.

12. An optical device as claimed in claim 11, wherein at least one component of the second image is co-linear with the specular reflection of the coherent light from the surface.

13. An optical device as claimed in claim 1, wherein the diffractive structure is combined with an additional visual holographic or diffractive device, and wherein the additional visual holographic or diffractive device replays in response to white light illumination a holographic or diffractive image visible to an observer for authentication.

14. An optical device as claimed in claim 13, wherein the diffractive structure is formed integrally with a visual holographic or diffractive device.

15. An optical device as claimed in claim 1, wherein the optical device is formed as a single continuous structure.

16. An optical device as claimed in claim 1, wherein the visible second image is asymmetric in form.

17. An optical device as claimed in claim 1, including at least one additional diffractive structure comprising a substantially smaller diffraction grating carrier pitch arranged to replay under white light illumination a respective additional first image which is non-visible to an observer and arranged to replay under coherent light illumination in a Littrow geometry a respective additional second covert image visible to an observer when imaged on a plane located in a direction near the direction of illumination and imaging on a separate image plane located away from the physical plane of the optical device.

18. An optical device as claimed in claim 17, wherein the smaller diffraction grating carrier pitch is 0.6 microns or less.

19. An optical device as claimed in claim 17, wherein the respective additional second image comprises any one of, or any combination of, alphanumeric characters, graphical indica or continuous tone images.

20. An optical device as claimed claim 17, wherein the at least one additional diffractive structure is superposed upon the other diffractive structures.

21. An optical device as claimed in claim 17, wherein the at least one additional diffractive structure is located in a discrete region of the optical device arranged to replay upon illumination with white light a visually discernable image located at or near the physical plane of the optical device when observed from a direction close to the direction of illumination.

22. An optical device as claimed in claim 1, wherein the device has been holographically originated through a Benton type H1 to H2 transfer arrangement.

23. An optical device as claimed in claim 1, wherein the device has been manufactured using holographic optical masking techniques.

24. An optical device as claimed in claim 1, wherein the device has been manufactured by a method of computer calculation of the diffractive structure.

25. An optical device as claimed in claim 24, wherein the direct writing technique is via electron beam lithography.

26. An optical device as claimed in claim 24, wherein the device has been manufactured by optical reduction and projection.

27. An optical device as claimed in claim 1 and comprising an optical security device.

* * * * *